No. 800,748. PATENTED OCT. 3, 1905.
G. M. LUDLOW.
PRICE SCALE.
APPLICATION FILED FEB. 6, 1904.
2 SHEETS—SHEET 1.
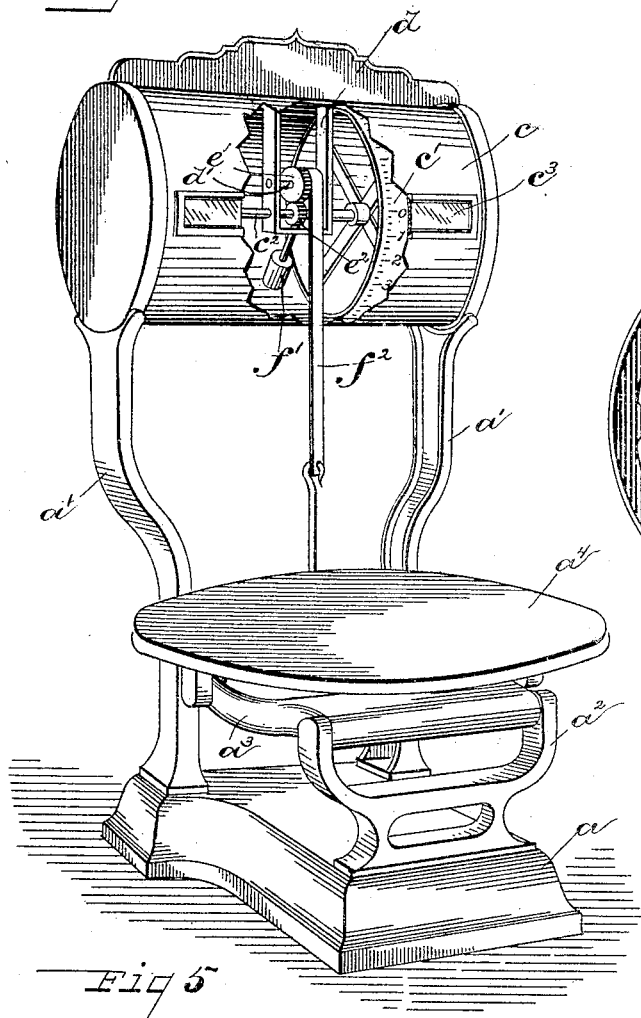
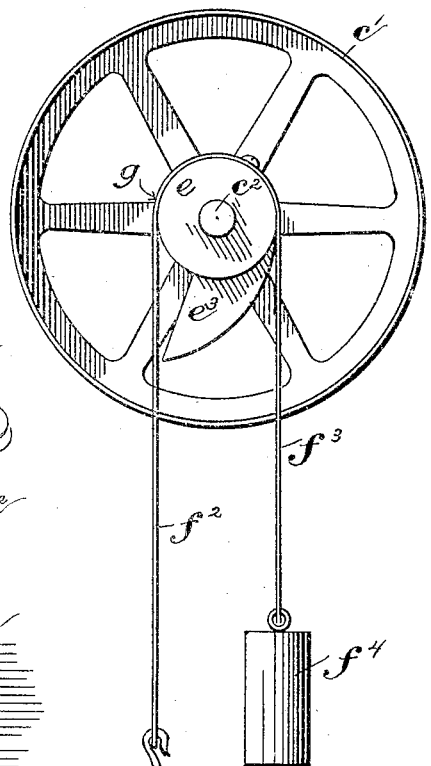
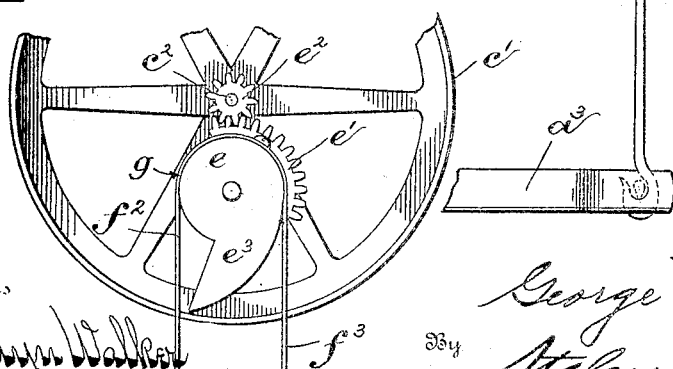
Witnesses
Inventor
George M. Ludlow
By Staley & Bowman
Attorneys

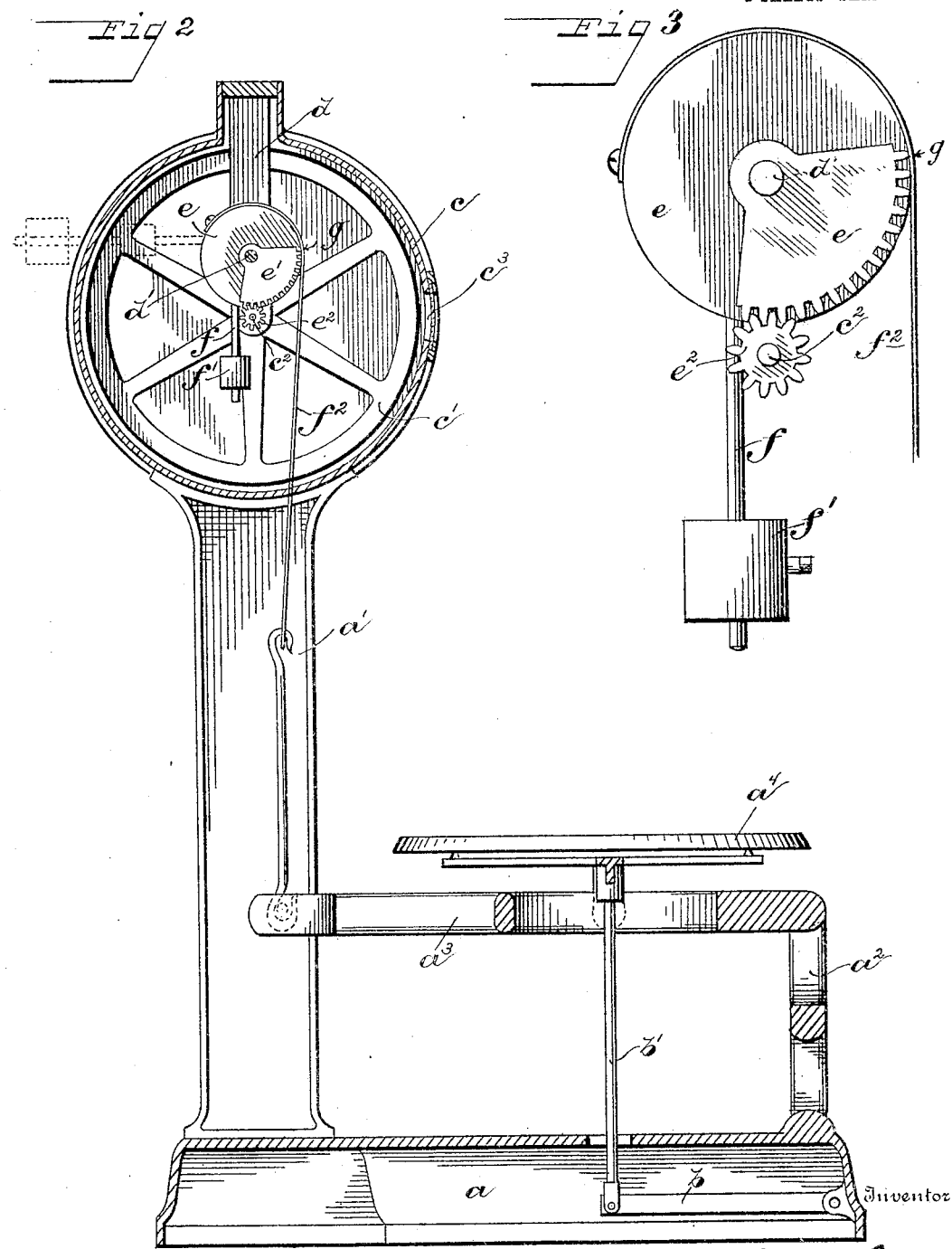

UNITED STATES PATENT OFFICE.

GEORGE M. LUDLOW, OF CHICAGO, ILLINOIS, ASSIGNOR TO COMPUTING SCALE COMPANY OF AMERICA, OF JERSEY CITY, NEW JERSEY, A CORPORATION OF NEW JERSEY.

PRICE-SCALE.

No. 800,748.      Specification of Letters Patent.      Patented Oct. 3, 1905.

Application filed February 6, 1904. Serial No. 192,315.

*To all whom it may concern:*

Be it known that I, GEORGE M. LUDLOW, a citizen of the United States, residing at Chicago, in the county of Cook and State of Illinois, have invented certain new and useful Improvements in Price-Scales, of which the following is a specification.

My invention relates to platform weighing-scales, and particularly to that class of scales in which the weight of the commodity placed on the platform and, if desired, the total price of such commodity at various sums per pound are indicated on a cylindrical revoluble indicator; and its object is to greatly simplify the construction, as well as the means and mode of operation of such machines, whereby they are not only cheapened in construction, but are rendered unlikely to get out of order and are made easy of operation.

My invention consists of the means, mechanism, constructions, and modes of operation hereinafter fully described, and set forth in the appended claims.

In the drawings, Figure 1 is a perspective view of a scale, partly broken away, illustrating my invention. Fig. 2 is a vertical sectional view of same. Fig. 3 is a detail of counterbalancing device and means for operating the cylindrical indicator. Figs. 4 and 5 are modifications of the mechanism shown in Fig. 3.

Similar parts are indicated by similar characters of reference throughout the several views.

In the drawings, $a$ represents the scale-base, having the uprights $a'$ and the fulcrum-support $a^2$ for the platform-beam $a^3$, on which is mounted the platform $a^4$. This portion of the scale may be of any suitable form; but inasmuch as the platform-beam $a^3$ descends varying distances, according to the different weights which are placed upon the platform, I prefer to employ within the base portion $a$ the pivoted link $b$, which is at all times parallel to the platform-beam $a^2$, and a vertical connection $b'$, integral with the platform $a^4$ and pivoted to said link $b$, whereby the platform $a^4$, which is supported by two directly-opposite knife-edge bearings, is maintained in a level position at all points of its descent under different loads.

At the upper extremities of the uprights $a'$ is the cylindrical casing $c$, within which is the cylindrical revoluble indicator $c'$, mounted on the shaft $c^2$. On the periphery of the revoluble indicator $c'$ are the characters or figures indicating the different units of weight and multiples thereof, and in a straight line coincident with each or any of said weight-markings and parallel with the longitudinal axis of said indicator may be placed figures indicating the total prices of that amount of a commodity at various different prices per pound.

In the casing $c$, parallel with its longitudinal axis, is an opening or slot $c^3$, preferably covered with glass, through which the various weight and price characters may be read.

Centrally located in the cylindrical casing $c$ is a pendent support or bracket $d$. The revoluble indicator $c'$ is formed in two parts located on either side of said support $d$. The support $d$ carries a counter-shaft $d'$, on which is mounted a drum $e$, having either formed integrally therewith or attached thereto a gear-segment $e'$, which engages a spur-gear $e^2$ on the indicator-shaft $c^2$. Rigidly connected with either the drum $e$ or the counter-shaft $d'$, but preferably with the drum $e$, is an arm $f$, having adjustably mounted thereon a weight $f'$. This arm normally hangs perpendicular, or nearly so, and moves from said perpendicular toward a horizontal position, the amount of said movement being in proportion to the load placed on the scale-platform, reaching the horizontal position when the maximum load which the scale is capable of weighing is on the scale-platform. This movement of the arm $f$ is accomplished by means of a tape or band $f^2$, which partly encircles and is at its extremity attached to the drum $e$, the other end of said tape being connected by suitable means with the scale-beam $a^3$. The ratio of the gear-segment $e'$ and gear $e^2$ is such that the movement of the arm $f$ from its normal to a horizontal position, as shown in dotted lines, Fig. 2, will cause the indicator $c'$ to make one complete revolution. Said arm $f$ is preferably of such length that it will operate entirely within the casing $c$; but said casing might be provided with a slot and said arm extended beyond the casing, as shown in Fig. 2 in dotted lines.

It will be noted that as a load is applied to the platform the arm $f$, with its weight $f''$, moves from its normal position and by its varying leverage automatically counterbalances the load applied to the platform, and by means of the gear-segment $e'$ and gear $e^2$ the indicator $c'$ is rotated to indicate by the characters visible through the opening $c^3$ the correct weight of the load. The drum $e$, with the weighted arm $f$, constitutes a lever having the counter-shaft $d'$ as the fulcrum in which the arm represented by the radius of the drum $e$ is constant while the opposite arm is variable, depending upon the movement of the weighted arm $f$ from its normal position, which is in proportion to the weight upon the scale-platform, and the point of application $g$ of the load is invariable in its relation to fixed points of the scale under varying weights. Briefly stated, the leverage principle involved is one in which one arm of the lever—i. e., the radius of the drum—is constant with a varying load represented by the pull of the tape $f^2$, while the other lever-arm is variable with a constant load—i. e., the weight $f''$. This same principle is illustrated in the modification shown in Fig. 4, in which the drum $e$ is mounted on the shaft $c^2$ and is provided with a cam projection $e^3$, over which runs a tape $f^3$, attached at one end to the drum $e$ and carrying at its opposite end a weight $f^4$. It is obvious that as power is applied to the tape $f^2$ the drum will revolve, the cam projection $e^3$ thereof will move upward and outward, the arm of the lever represented by a line from the fulcrum or shaft $c^2$ to the point of tangency of the cam $e^3$ with the tape $f^3$ being variable, while the weight $f^4$, also the arm represented by the radius of the drum $e$, are constant, and, as in the form illustrated in Figs. 1, 2, and 3, the load on the platform is balanced by the weight $f^4$ acting over a variable leverage in proportion to the load on the scale-platform. However, in the form shown in Fig. 4 only a portion of the surface of the revoluble indicator is available for indicating purposes, since in this form said indicator will make but a partial revolution; but the entire surface may be rendered available by the introduction of the gear-segment $e'$ and gear $e^2$, as illustrated in Fig. 5.

Having thus described my invention, I claim—

1. In a scale, the combination, with a scale-frame, of a cylindrical revoluble indicator, a platform located and supported on the platform-beam between the fulcrum and the point of connection with said indicator, an automatic counterbalancing device, a disk and a flexible connection between said disk and scale-beam, the disk and counterbalancing-weight being located within the projected periphery of the cylindrical indicator.

2. In a scale, the combination of a platform, a scale-beam, a link extending upwardly from one end of said beam, a flexible device connected to one end of said link, a disk connected to the other end of said flexible device, a shaft, and gears connecting said shaft with said disk, a counterbalancing-weight also connected with said disk, said disk, gears and counterbalancing-weight all being located within the projected periphery of the indicator.

3. In a scale, a platform, a scale-beam supporting said platform, an indicator-shaft, and a flexible connection extending between said scale-beam and said shaft, a counterbalancing-weight, a disk, a gear connecting said shaft with said flexible connection, a cylindrical indicator located at one side of said disk, a gear, said disk, counterbalancing-weight and gear being located within the projected periphery of said indicator.

In testimony whereof I have hereunto set my hand this 18th day of January, A. D. 1904.

GEORGE M. LUDLOW.

Witnesses:
SAMUEL M. HASTINGS,
D. A. BLISS.